2,416,996

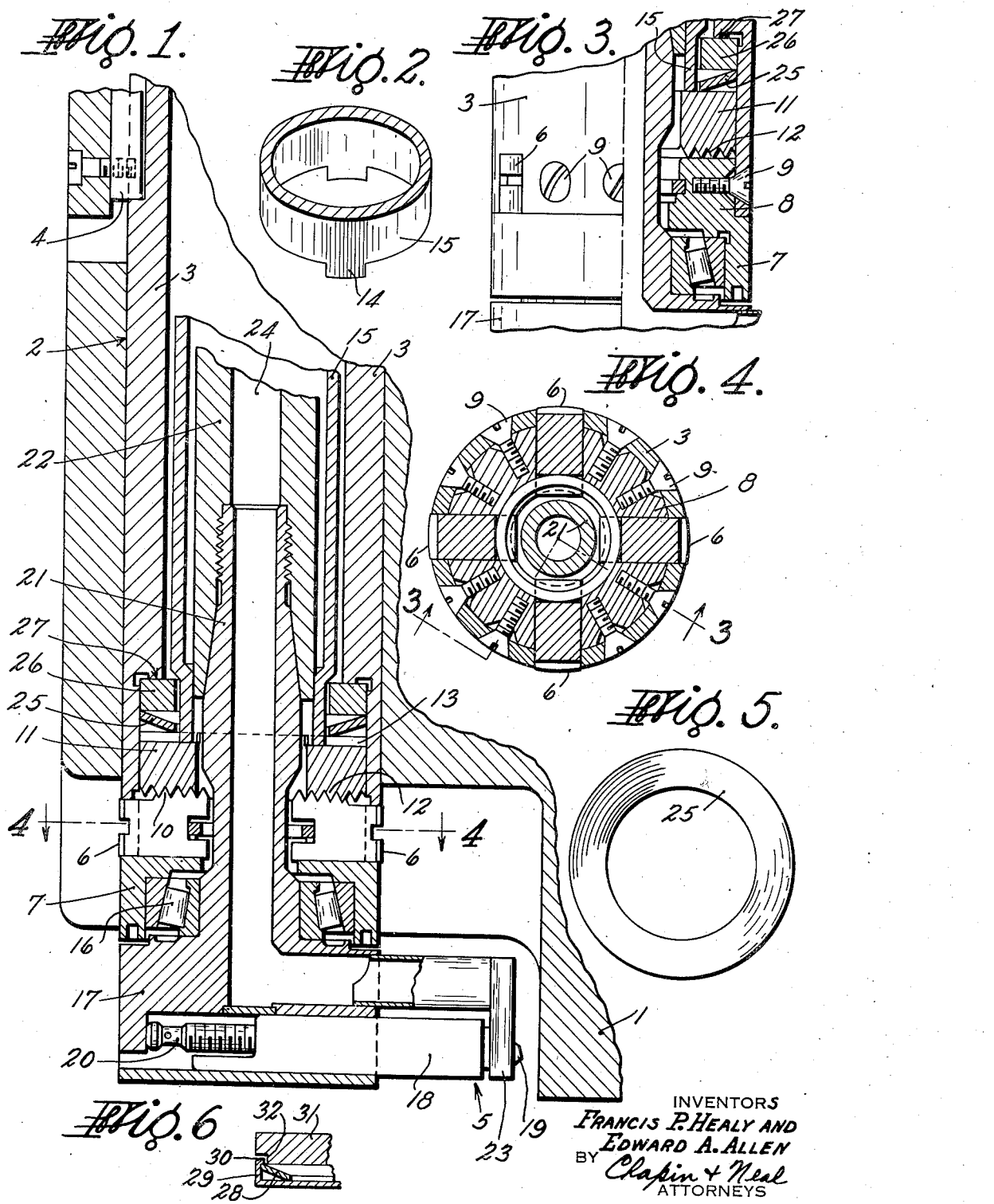
March 4, 1947.  F. P. HEALY ET AL  2,416,996
BORING BAR GUIDING MECHANISM
Filed Oct. 26, 1945
INVENTORS
FRANCIS P. HEALY AND
EDWARD A. ALLEN
BY Chapin + Neal
ATTORNEYS Patented Mar. 4, 1947

UNITED STATES PATENT OFFICE 2,416,996

BORING BAR GUIDING MECHANISM

Francis P. Healy, Springfield, and Edward A. Allen, Westfield, Mass., assignors to Van Norman Company, Springfield, Mass., a corporation of Massachusetts Application October 26, 1945, Serial No. 624,886

2 Claims. (Cl. 77—53)

In the use of cylinder boring devices provided with follow guides, it sometimes occurs that wear of the tool in a hard bore will cause the bore to become somewhat tapered and the follow guides to become jammed. It has been proposed to use as a safety measure an adjusting cone extending between the tapered inner ends of the follow guide, and to back up the cone with a helical coil spring to permit it to retract upon overload. For various reasons it is preferable to use a scroll with a ground spiral thread as an adjusting mechanism for the follow guides, and it is the object of the present invention to provide a safety mechanism for scroll-adjusted follow guides which will prevent binding due to tool wear without sacrificing rigidity of support or compactness of assembly.

The invention will be described with reference to the accompanying drawing, in which Fig. 1 is a central section through a portion of a portable boring bar embodying the invention;

Fig. 2 is a detail of the scroll adjusting mechanism;

Fig. 3 is a section on line 3—3 of Fig. 4;

Fig. 4 is a section on line 4—4 of Fig. 1;

Fig. 5 is a plan of a Belleville spring shown in section in Fig. 1; and

Fig. 6 is a sectional detail of a modification.

The boring bar is mounted on a base 1 by which it may be supported on the top of a cylinder block. This base has an upward extension having a cylindrical bore 2 in which a sleeve 3 slides vertically but is held against rotation as by a key 4. This reciprocable bar carries the rotating boring tool 5 and the non-rotating follow guides 6 as will be described, and is moved slowly through the bore by mechanism not shown. A retaining member 7 has a shouldered portion 8 fitting inside the sleeve and secured to it by screws 9. The lower end of the sleeve is slotted to receive a series (preferably four) of follow guides 6, the upper surfaces of which are threaded at 10 to interfit with a rotatable scroll 11 having a spiral thread 12 on its lower surface. A diametral slot 13 is formed on the top of the scroll, into which fit projections 14 on the lower end of a tube 15. The scroll can therefore be turned to project or retract the follow guides by rotating the tube.

Mounted in the bottom of the retaining member on a roller bearing 16 is a cutter head 17 carrying a tool holder 18 bearing a removable tool bit 19. The tool holder preferably has a screw adjustment 20 so that it may be adjusted to size while removed from the cutter head as described in the patent to Arp 1,906,241, May 2, 1933. The shank 21 of the tool holder 18 projects upwardly into threaded engagement with a boring bar 22 which is rotated constantly during boring by mechanism not necessary to describe. A suction 23 to remove chips is shown in adjacency to the tool for connection by passageways 24 to a suction source, but forms no part of the present invention.

In operation the initial part of the hole is cut with the sleeve 3 guided by the bore 2 in the base. As soon as the boring has proceeded far enough for the bored hole in the work piece to receive the follow guides the latter are moved radially outwards by manual rotation of the tube 15 until they contact the freshly cut walls of the bored hole. Thereafter the guiding function is taken over by the follow guides. The latter must fit the bored hole sufficiently snugly to prevent wobble of the axis of the boring bar, but since they must slide vertically they must not fit too tightly or they will bind.

The size of the bored hole in which the follow guides slide tends to change along its length because of two opposed factors, wear of the tool bit and linear expansion of the tool holder due to the heat of cutting. Wear of the tool bit tends to cause a slight contraction in the diameter of the hole as boring proceeds, while expansion of the tool holder (which is augmented by the increased heating as the tool becomes dulled) tends to cause an increase in this diameter. Neither effect causes serious disturbance in short holes. In boring long holes in moderately hard material the two effects nearly neutralize each other, and can be controlled very closely by a preliminary adjustment of the temperature of the tool holder by immersion in a water bath.

Where long holes of particularly hard metal are to be bored, however, tool wear may exceed the increase in diameter due to thermal expansion, particularly towards the end of the hole. There is thus danger of the follow guides seizing in the bore, stopping advance of the boring bar and ruining the smoothness of the cut. This is particularly the case if a user, used to unchilled cast iron, gives a preliminary heating to the tool holder before starting work on a hard metal work piece such as the long sleeves with which some cylinders are lined. It is thus necessary to provide some safety measure to prevent sticking of the follow guides in the bore.

Individual spring mounting of the follow guides is impracticable since it would destroy accurate centralization of the boring bar by permitting independent yielding of that guide opposite to the tool bit. The tube 15 is generally provided with a take up spring (not shown) allowing rotation of the scroll to advance the follow guides if the bored hole enlarges, but the low angle of the spiral scroll threads renders the scroll action irreversible under inward pressure on the guides so that rotation of the scroll to cause yielding of this spring cannot be relied on as a safety means. We have found that inward pressure on the guides, while incapable of causing rotation of the scroll, can act by wedging action between the teeth on the guides and that on the scroll (which are preferably 60° threads) to raise the scroll slightly and thus provide a freedom for inward motion of the guides provided the scroll is held down by a spring of suitable characteristics.

Here again the problem is not simple. An ordinary helical compression spring is capable of permitting vertical motion of the scroll but its deflection is proportional to the load and is so large in size as to disturb other design factors required for accurate centralization of the axis of rotation. We have found that conical spring washers, or Belleville springs, have very desirable characteristics in this particular use, particularly if preloaded and having a particular ratio of their overall thickness ($h$) to the thickness ($t$) of the flat metal of which they are made. Such a spring 25 may be placed between the upper surface of the scroll and a spacing washer 26 bearing against a shoulder 27 within the sleeve 3.

If a Belleville spring is made with a proper $h/t$ ratio, generally between 1.4 and 2.0, and is progressively compressed, the curve of load vs. deflection will first rise, then level off, and for higher ratios finally drop. A subsequent very steep rise is unimportant for stresses met with here. By preloading such a spring until it has reached the horizontal part of the load-deflection curve a considerable range of deflection can be obtained without changing the load. Translated into terms of the present problem, if the scroll is backed up by such a preloaded spring the follow guides will be free to move inwardly as required by changes in the diameter of the bored hole while maintaining their pressure against the walls of the hole substantially constant. This keeps the friction on the walls and the centralizing action of the follow guides uniform through a substantial change in diameter of the hole as boring proceeds. In addition, an unexpectedly large decrease in bore diameter can produce a very rapid accommodation of the follow guides due to the falling off of the load corresponding to additional deflection.

In Fig. 6 we have shown a spring mounting utilizing this effect. The Belleville spring 28 is here mounted within a metal cup 29 which rests upon the upper surface of the scroll and has its upper edge turned over at 30 to hold the spring under the desired degree of preloading. The spacing washer 31 is shouldered at 32 so that it may bear against the upper flattened surface of the spring. In use, the initial rotation of the scroll to position the follow guides against the bore walls with the desired pressure brings the scroll, cup, spring, and spacing washer tightly together. If the bore decreases in size the follow guides may move inwardly without substantial change in their pressure against the bore walls, since the load on the spring remains substantially constant over a range of deflection greater than that ordinarily produced by changes in bore diameters.

We claim:

1. In a boring device comprising a rotatable and reciprocable cutter head and guide fingers mounted to the rear of the cutter head for reciprocation therewith without rotation, mechanism for adjusting and supporting the guide fingers comprising a scroll having a spiral wedge shaped groove engaging wedge shaped teeth on the several guide fingers, means for rotating the scroll to adjust the fingers, and a Belleville spring washer supporting the scroll on the side remote from the spiral groove to permit it to move bodily away from the fingers upon the fingers being compressed by a contraction in the bore, whereby the fingers will be permitted a radially inward movement by sliding of their wedge shaped teeth upon the sides of the wedge shaped groove.

2. In a boring device comprising a rotatable and reciprocable cutter head and guide fingers mounted to the rear of the cutter head for reciprocation therewith without rotation, mechanism for adjusting and supporting the guide fingers comprising a scroll having a spiral wedge shaped groove engaging wedge shaped teeth on the several guide fingers, means for rotating the scroll to adjust the fingers, and a Belleville spring washer supporting the scroll on the side remote from the spiral groove to permit it to move bodily away from the fingers upon the fingers being compressed by a contraction in the bore, whereby the fingers will be permitted a radially inward movement by sliding of their wedged shaped teeth upon the sides of the wedge shaped groove, said Belleville spring having a ratio of overall height to metal thickness such as to give an intermediate load-deflection zone in which load is substantially independent of deflection, and a retainer receiving the spring and preloading it to a load within said zone.

FRANCIS P. HEALY.
EDWARD A. ALLEN.

REFERENCES CITED

The following references are of record in the file of this patent:

UNITED STATES PATENTS

| Number | Name | Date |
| --- | --- | --- |
| 1,870,350 | Van Norman | Aug. 9, 1932 |
| 2,004,228 | Storm et al. | June 11, 1935 |

FOREIGN PATENTS

| Number | Country | Date |
| --- | --- | --- |
| 427,181 | British | Apr. 15, 1935 |